United States Patent [19]

Sasaki

[11] Patent Number: 4,864,244

[45] Date of Patent: Sep. 5, 1989

[54] STEPPED SQUARE-QAM DEMODULATOR UTILIZING ALL SIGNAL POINTS TO GENERATE CONTROL SIGNALS

[75] Inventor: Eisaku Sasaki, Tokyo, Japan

[73] Assignee: NEC Corporation, Japan

[21] Appl. No.: 246,863

[22] Filed: Sep. 20, 1988

[30] Foreign Application Priority Data

Sep. 21, 1987 [JP] Japan ................. 62-236489
Sep. 21, 1987 [JP] Japan ................. 62-236490
Apr. 25, 1988 [JP] Japan ................. 63-101542

[51] Int. Cl.[4] ............................ H04L 27/22
[52] U.S. Cl. ................... 329/304; 375/39; 375/80; 375/83; 375/98
[58] Field of Search ............. 329/50, 110, 122, 124, 329/135; 375/39, 80, 83, 98

[56] References Cited

U.S. PATENT DOCUMENTS 4,546,322 10/1985 Crutcher ................. 329/135 X
4,574,246 3/1986 Yoshida ................. 329/50 X Primary Examiner—Siegfried H. Grimm
Attorney, Agent, or Firm—Laff, Whitesel, Conte & Saret

[57] ABSTRACT

In a stepped square QAM demodulator, each of the I- and Q-channel demodulated analog signals is supplied to an AGC and/or dc offset controller and converted to an N-bit digital signal by comparison with prescribed decision thresholds. The digital signals of outermost signal points in the stepped square phasor diagram of the SS-QAM system are converted to digital signals of signal points which form corner portions of a true square phasor diagram and the digital signals of inner signal points of the stepped square phasor diagram are converted to digital signals of corresponding signal points in the true square phasor diagram. An M-bit main data signal is derived from all of the converted digital signals (where M is smaller than N) and an auxiliary data signal is generated representing whether the M-bit main data signal represents the digital signals of the inner or outermost signal points. A first error signal representative of an error component of the M-bit main data signal and a second error signal representative of an error component of the auxiliary data signal are generated and selectively applied to a control signal generator in response to the auxiliary data signal together with the main data signal to generate a control signal for application to the AGC and/or dc offset controller.

7 Claims, 7 Drawing Sheets

STEPPED SQUARE-QAM DEMODULATOR UTILIZING ALL SIGNAL POINTS TO GENERATE CONTROL SIGNALS

BACKGROUND OF THE INVENTION

The present invention relates to demodulators of quadrature amplitude modulation (QAM) digital radio communications systems, and more specifically to the improvement of the dc offset of control means of such a demodulator which controls the dc offset of the quadrature signals which are derived from the demodulation of the incoming signal by synchronous detection.

In the past, amplitude and phase shift keying techniques have been developed for use in digital radio communications systems to take advantage of their high efficiency in frequency utilization. Among the amplitude and phase shift keying techniques, multilevel quadrature amplitude modulation technique has been extensively used because of its advantages for practical applications. The sinewave carrier used in the multilevel quadrature amplitude modulation systems is modulated so that its amplitude and phase varies independently of each other as a function of the two baseband signals. In the signal space diagram which is a polar coordinate representation of the quadrature amplitude modulation signal, the signal points of such QAM signals are located at intersections of rows and columns in an area bounded in a rectangular configuration.

In the phasor diagram of a conventional 256-QAM signal, the 256 signal points of the QAM signal align themselves along I- and Q-channel axes, forming a square shaped constellation of 16 rows and 16 columns. Another multilevel QAM technique that has recently been developed and is known as stepped square quadrature amplitude modulation (SS-QAM) is one having a phasor diagram having a stepped square signal constellation of 18 rows and 18 columns. With this stepped square phasor diagram, the symbol error rate can be improved over the conventional-QAM system, or C-QAM. A further benefit of the SS-QAM system is that it is tolerant of the nonlineary characteristic of the transmitter's high gain amplifier. A comparison between a 256-SS-QAM modulation system and a 256-C-QAM system reveals that a group of 6 signal points located at each corner area of the square shaped constellation of the 256-C-QAM system corresponds to one of two rows and two columns of 6 signal points each which are located on the imaginary outlines of the stepped square configuration of the 256-SS-QAM system.

A demodulator of the 256-SS-QAM system has been proposed to combine the benefits of the improved transmission characteristics with low-cost circuits employed in the C-QAM system. One approach is to perform transposition of such outermost signals of the SS-QAM signal constellation to corresponding signal points of the C-QAM system to control the dc offset of the demodulated quadrature signals. As shown in FIG. 1, the prior art demodulator of a 256-SS-QAM system comprises a signal point transposer 104 for each of the I-channel (in-phase) and the Q-channel (quadrature-phase) systems. Signal point transposer 104$i$ of the I-channel receives digital signals supplied from A/D converters 103$i$ and 103$q$ and transposes the signal points of the I-channel signal which lie on the outermost columns of the stepped square signal constellation of the SS-QAM system to the corresponding signal points of the C-QAM system and generates an I-channel main data signal Di which represents one of 16 amplitudes of the I-channel signal. Transposer 104$i$ further generates an I-channel error signal Ei which represents an error contained in the I-channel main data signal Di. The I-channel error signal Ei is a binary signal having one-half the quantum size of the 16 quantization levels of the I-channel main data signal Di and represents the direction of deviation of each of the 16 amplitude levels of the I-channel signal with respect to a corresponding one of the prescribed 16 decision thresholds with which the A/D converter 103$i$ compares the amplitude of the I-channel signal demodulated by synchronous detector 100 to convert it to a corresponding digital signal. The error signal Ei having a logic-0 indicates that the signal point of the I-channel main data signal Di deviates on the outer side of the corresponding signal point and hence it deviates on the negative side of the corresponding decision threshold and the error signal having a logic-1 indicates that signal Di deviates on the inner side of the corresponding point and hence on the positive side of the corresponding decision threshold.

The I-channel main data signal Di and the I-channel error signal Ei from the signal point transposer 104 are supplied to a control signal generator 102, which identifies those signals which are located on the outside of the I-axis 15-th column of the C-QAM phasor diagram, where errors of positive peak amplitudes exist, and further identifies those signals which are located on the outer side of the I-axis 0-th column, where errors of negative peak amplitudes exist. The signal points falling outside the 15-th column of the C-QAM system phasor diagram can be considered to be a deviation of the amplitude of the signal on the I-axis 15-th column on the positive side of the optimum amplitude and the signal points falling outside the 0-th column of the C-QAM system can be considered to be a deviation of the amplitude of the signal at the I-axis 0-th column on the negative side of the optimum amplitude. Control signal generator 102 counts such positive and negative deviation that occur within a prescribed time interval and compares the counts to control the automatic gain controller 101 so that it reduces the dc offset when the count of the positive deviations is greater than the other by a predetermined amount and increases it when the count of the negative deviations is greater than the other by a predetermined amount. In this way, the I-channel main data signal Di represents the true amplitude level of the I-channel signal. Similar operations take place in the Q-channel. Signal point transposer 104$q$ of the Q-channel receives digital signals supplied from A/D converters 103$q$ and 103$i$ and transposes the signal points of the Q-channel signal which lie on the outermost rows of the stepped square signal constellation of the SS-QAM system to the corresponding signal points of the C-QAM system and generates a Q-channel main data signal Dq which represents one of 16 amplitudes of the Q-channel signal.

However, four peak amplitudes at signal points a, b, c and d of the SS-QAM system as indicated in FIG. 4 are transposed respectively to signal points a', b', c' and d' of the C-QAM system shown at FIG. 5. Since these transposed signal points do not contribute to the generation of the dc offset signal, the error signal generated by the prior art SS-QAM demodulator lacks precision. A further disadvantage is that the signal point transposition requires complex, expensive circuitry.

SUMMARY OF THE INVENTION

An object of the present invention is therefore to provide a demodulator which permits all the necessary signal points to contribute to the generation of a control signal.

A further object of the invention is to provide a demodulator of simple circuit configuration which automatically controls the gain and/or dc level of the I- and Q-channel signals without requiring complex, signal point transposition circuitry.

Specifically, the stepped square QAM (quadrature amplitude modulation) demodulator of the present invention comprises a synchronous detector for demodulating a signal modulated in accordance with a stepped square quadrature amplitude modulation system to produce a pair of I-channel (in-phase) and Q-channel (quadrature-phase) demodulated analog signals which are respectively fed to I-channel and Q-channel systems of identical configuration. Each of the I- and Q-channel systems comprises an AGC and/or dc offset controller for controlling the demodulated signal of the associated channel in accordance with a control signal applied thereto, In each system, an analog-to-digital converter is connected to the AGC/dc offset controller for converting its output into an N-bit digital signal by comparison with prescribed decision thresholds. A code converter is provided for converting the digital signals of outermost signal points in the stepped square phasor diagram of the SS-QAM system to digital signals of signal points which form corner portions of a true-square phasor diagram and converting the digital signals of inner signal points of the stepped square phasor diagram to digital signals of corresponding signal points in the true square phasor diagram. The code converter derives an M-bit main data signal from all of the converted digital signals (where M is smaller than N) and generates an auxiliary data signal representative of whether the M-bit main data signal represents the digital signals of the inner or outermost signal points, a first error signal representative of an error component of the M-bit main data signal and a second error signal representative of an error component of the auxiliary data signal. The first and second error signals are selectively applied to a control signal generator in response to the auxiliary data signal to derive the control signal from the selected error signal and the main data signal.

With this code conversion process, all the outermost signal points contribute to the generation of the control signal. Since the code conversion of the invention is a process of discrimination between amplitudes, rather than a process of transposing signal points, such a conversion process can be advantageously implemented by a read-only memory storing digital signals of the inner and outermost signal points in locations addressable as a function of the N-bit digital signal.

In a more specific aspect, the control signal generator provides a first count indicating the number of signal points falling in a first outermost area of the stepped square phasor diagram and a second count indicating the number of signal points falling in a second outermost area of the phasor diagram opposite to the first outermost area and produces a dc offset control signal depending on the relative values of the first and second counts. The dc offset controller controls the dc level of the associated channel signal in response to the dc offset control signal so that it coincides with a center point between corresponding decision thresholds of the analog-to-digital converter. The control signal generator further provides a count indicating the number of signal points falling in a center rectangular area of the stepped square phasor diagram and a count indicating the number of signal points falling in oppositely located outermost areas of the stepped square phasor diagram to produce a gain control signal depending on the relative values of such counts, and the AGC controller responds to the gain control signal so that amplitude of the associated channel signal coincides with a corresponding one of the decision thresholds of the analog-to-digital converter.

Preferably, the maximum number of signal points that fall in the center rectangular area is equalized to the maximum number of signal points lying in the outermost areas to optimize control. In one practical embodiment, the equalization is performed by processing the main data signal supplied to the control signal generator in response to the auxiliary data signal of the other channel so that the outermost signal points of the stepped square phasor diagram which lie within the center rectangular area are transposed to the outside thereof.

BRIEF DESCRIPTION OF THE DRAWINGS

The present invention will be described in further detail with reference to the accompanying drawings, in which.

DETAILED DESCRIPTION

Figure 1:
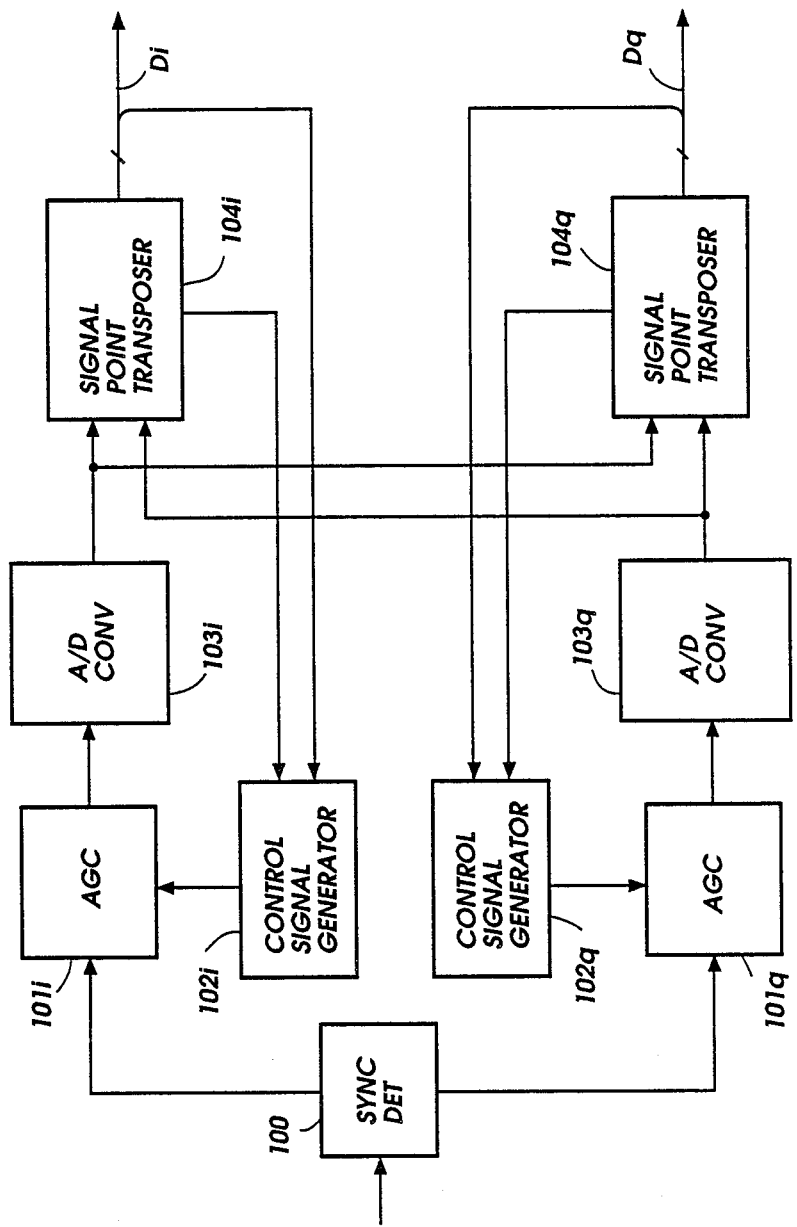
FIG. 1 is a block diagram of a prior art SS-QAM demodulator.
Figure 2:
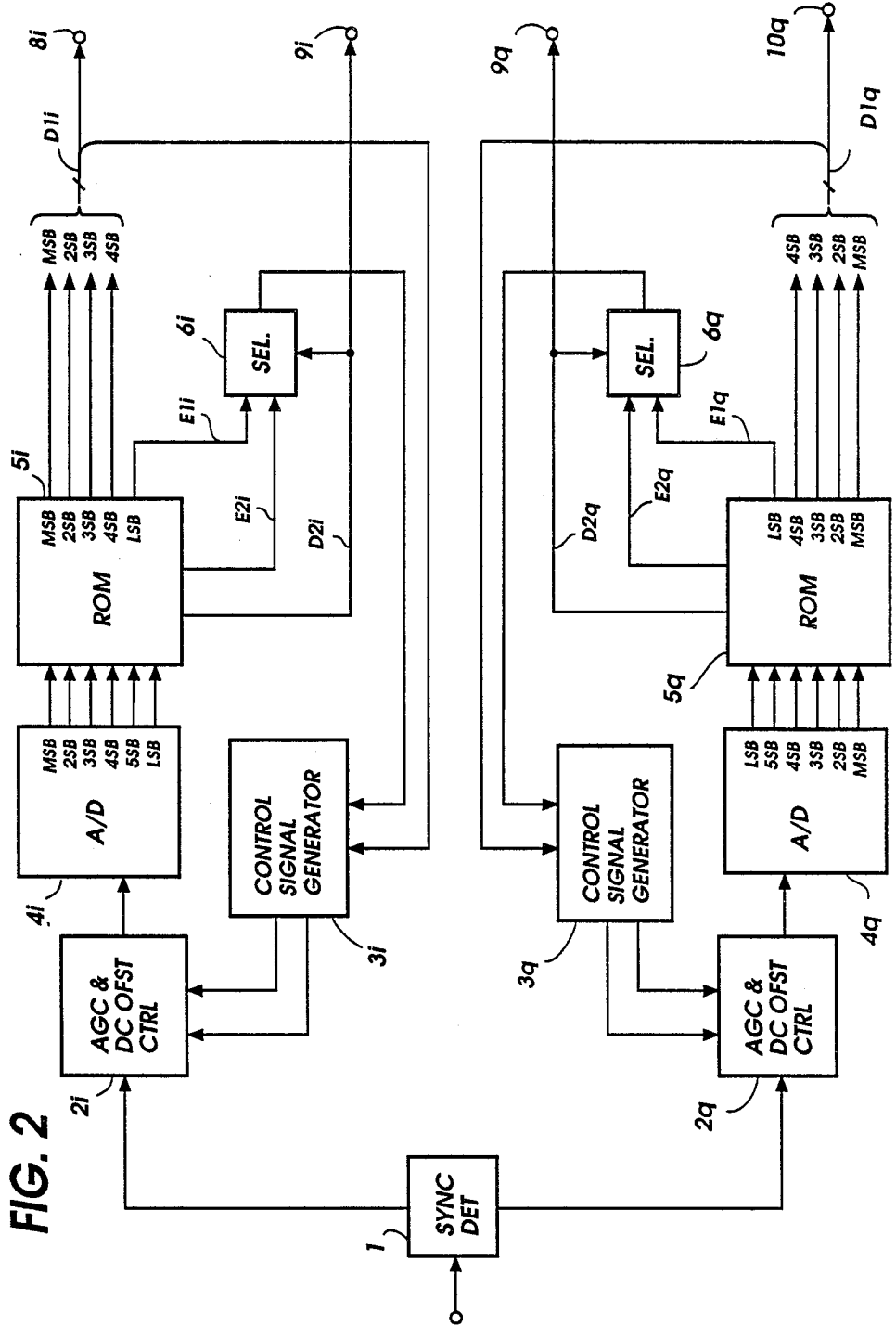
FIG. 2 is a block diagram of an SS/QAM demodulator according to a first embodiment of the present invention.

Referring now to FIG. 2, there is shown a QAM demodulator according to a first embodiment of the present invention. An SS-QAM input signal is demodulated into a pair of I- and Q-channel, multilevel analog signals by a synchronous detector 1 for coupling respectively to I- and Q-channel systems of identical construction in which the constituent components are identified by lower case letters i and q. Because of the similarities between the two channels, the following description is concerned only with the I-channel system. The I-channel system includes and AGC (automatic gain controlled amplifier) and dc offset control circuit 2i which receives gain and dc offset control signals from a control signal generator 3i to perform gain and dc offset control on the I-channel signal. The multilevel analog signal is fed to a 6-bit A/D converter 4i, which compares the instantaneous amplitude of analog signal with prescribed decision thresholds spaced at intervals and determines in which threshold intervals the amplitude falls and generates a 6-bit digital signal representing the maximum of the thresholds which are exceeded by the input signal. The output of the A/D converter $4i$ is a 6-bit code, with the higher five bits of the code, i.e. the MSB (most significant bit) to the 5SB (fifth significant bit) representing amplitude values "0" to "17" of the 18 signal points on the #0' column position to #15' column position of the SS-QAM phasor diagram. The LSB (least significant bit) contains information as to the error, or noise components of the higher bits.

Figure 3:
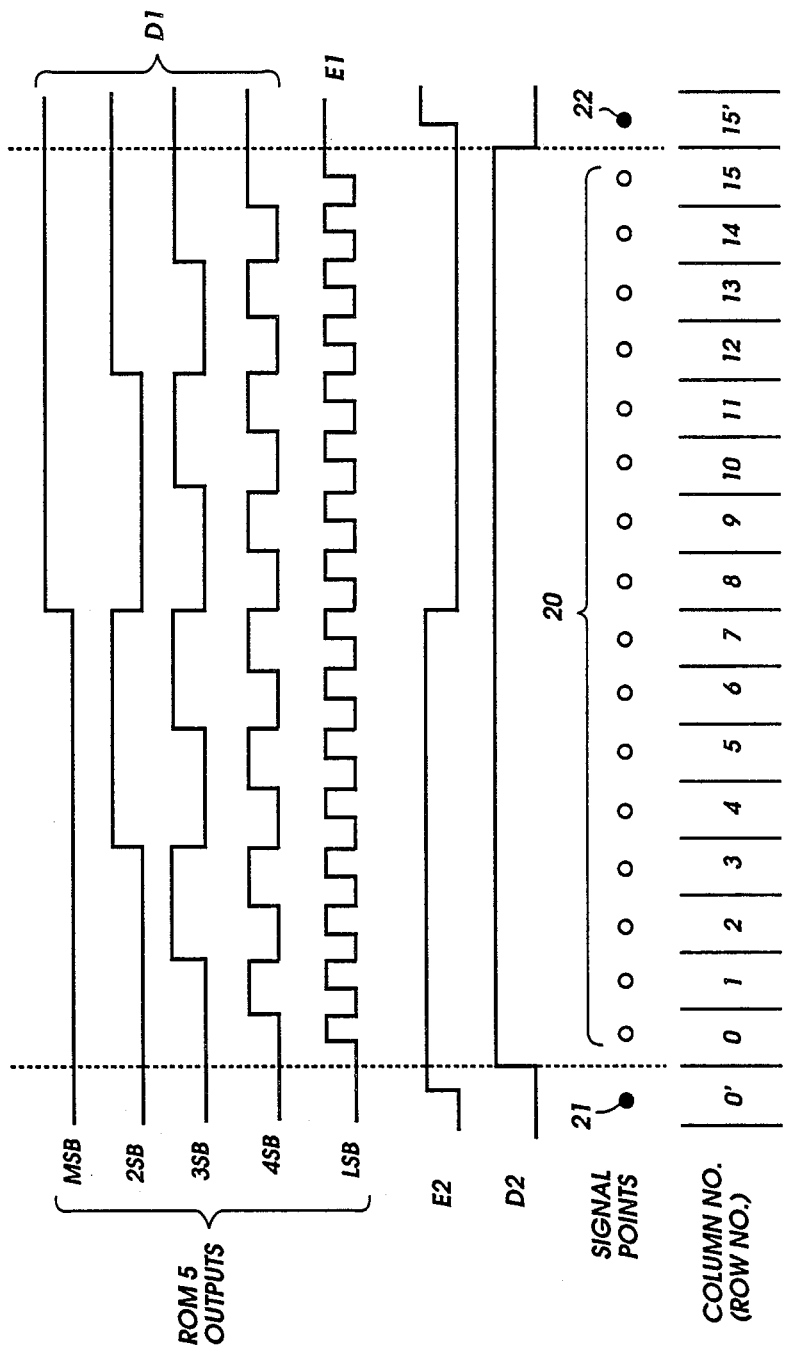
FIG. 3 is a timing diagram associated with the embodiment of FIG. 2.

The MSB to LSB outputs of the A/D converter $4i$ are supplied to a converter which is formed by a read-only memory $5i$. ROM $5i$ stores 5-bit output digital signals in locations addressable as a function of the 6-bit input digital signal from A/D converter $4i$. The conversion algorithm that describes the relationship between the input and output of the ROM $5i$ is such that the digital signals of inner signal points on #0 to #15 columns of the phasor diagram of FIG. 4 correspond to the digital signals of the corresponding inner signal points of the phasor diagram of FIG. 5 and those of the outermost signal points, i.e., #0' and #15' columns, of the phasor diagram of FIG. 4 correspond to those of the signal points located on the corner areas of the phasor diagram of FIG. 5. Thus, the memory $5i$ determines whether the amplitude of the I-channel signal falls in the range between #0 column and #15 column of the SS-QAM phasor diagram or falls outside that range. On the other hand, the amplitude discriminator $5q$ determines whether the amplitude of the Q-channel signal falls in the range between #0 row and #15 row of that SS-QAM phasor diagram or outside that range. As shown in FIG. 3, the haigher four bits of the 5-bit output code of ROM $5i$ are used to represent the amplitude of the I-channel signal and supplied as an I-channel main data signal $D1i$ to an output terminal $8i$ and to the control signal generator $3i$ and the LSB of the 5-bit code is supplied as an I-channel first error signal E1i to a first input of a selector $6i$ as an indication of the error component of the main data signal $D1i$. Read-only memory $5i$ further produces an I-channel auxiliary data signal $D2i$ which is at logic 1 when the amplitude (as indicated by blank dots 20 in FIG. 3) falls in the range between #0 column and #15 column and at logic 0 when it falls outside of that range (as indicated by solid dots 21 and 22). An I-channel second error signal E2i is further produced to represent the error component of the I-channel auxiliary signal and supplied to a second input of the selector $6i$. The I-channel auxiliary data signal $D2i$ is supplied to an output terminal 9i and to the control input of the selector $6i$. The selector $6i$ selectively supplies the input error signals E1i and E2i to the control signal generator 3 depending on the logic state of the auxiliary data signal $D2i$. Specifically, the selector $6i$ passes the first error signal E1i to the control signal generator $3i$ when the auxiliary data signal $D2i$ is at logic 1 (indicating that the main data signal $D1i$ falls within the range between #0 and #15 columns) and passes the second error signal E2i when the auxiliary data signal is at logic 0 indicating that the main data signal $D1i$ represents the outermost column. The output terminal $8i$ and $9i$ are connected to an I-channel FEC (forward error correction) circuit, not shown.

By the amplitude discrimination process just described, the first error signals E1 of both channels exclude error information associated with the unnecessary signal points a, b, c and d which would otherwise be treated as falling within square shaped boundaries and the second error signals E2 of both systems contain necessary error information associated with all signal points including points a, b, c and d that fall outside the square shaped boundaries. Thus, signal points a, b, c and d, which have been lost with the prior art, now contribute to the generation of the second error signals E2i and E2q.

Figure 4:
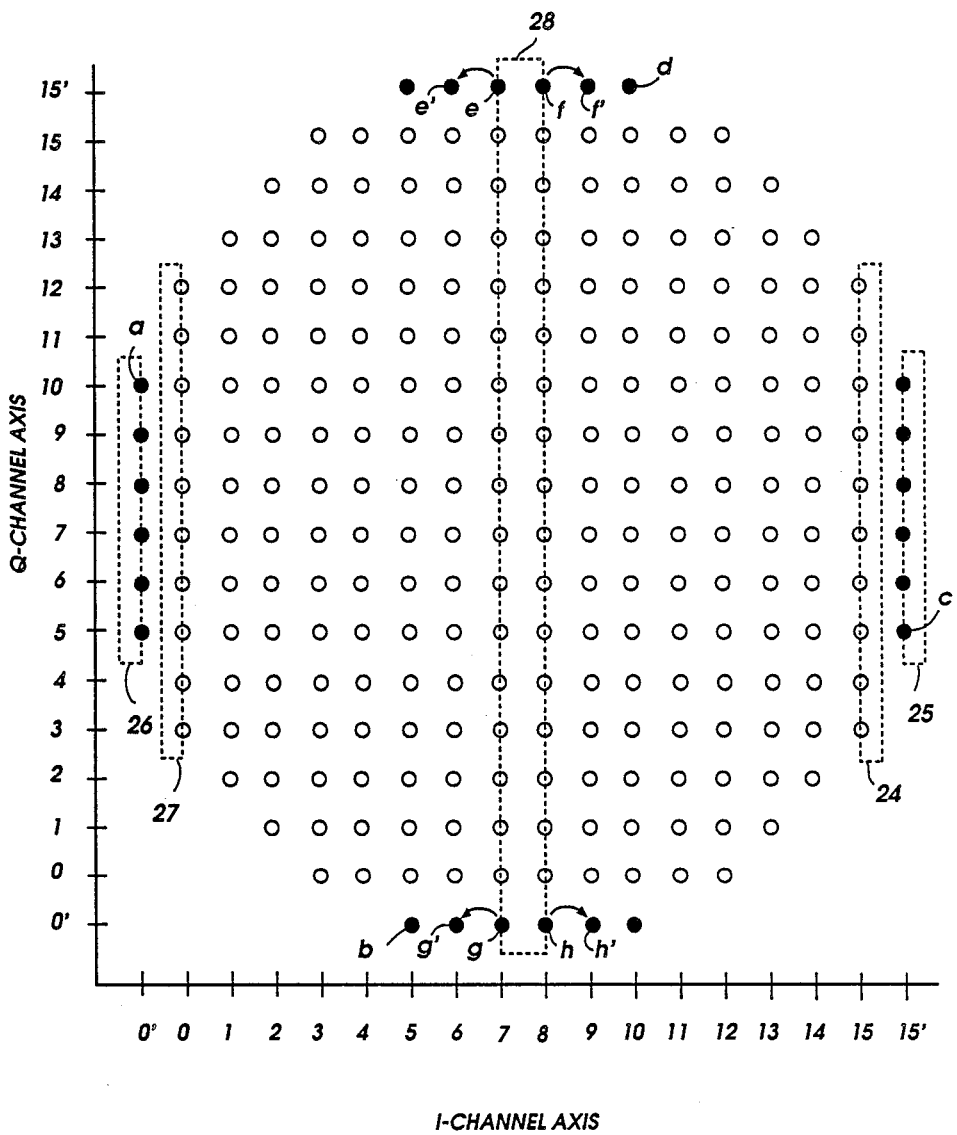
FIG. 4 is a phasor diagram of the SS-QAM system, useful for describing the operation of the present invention.
Figure 5:
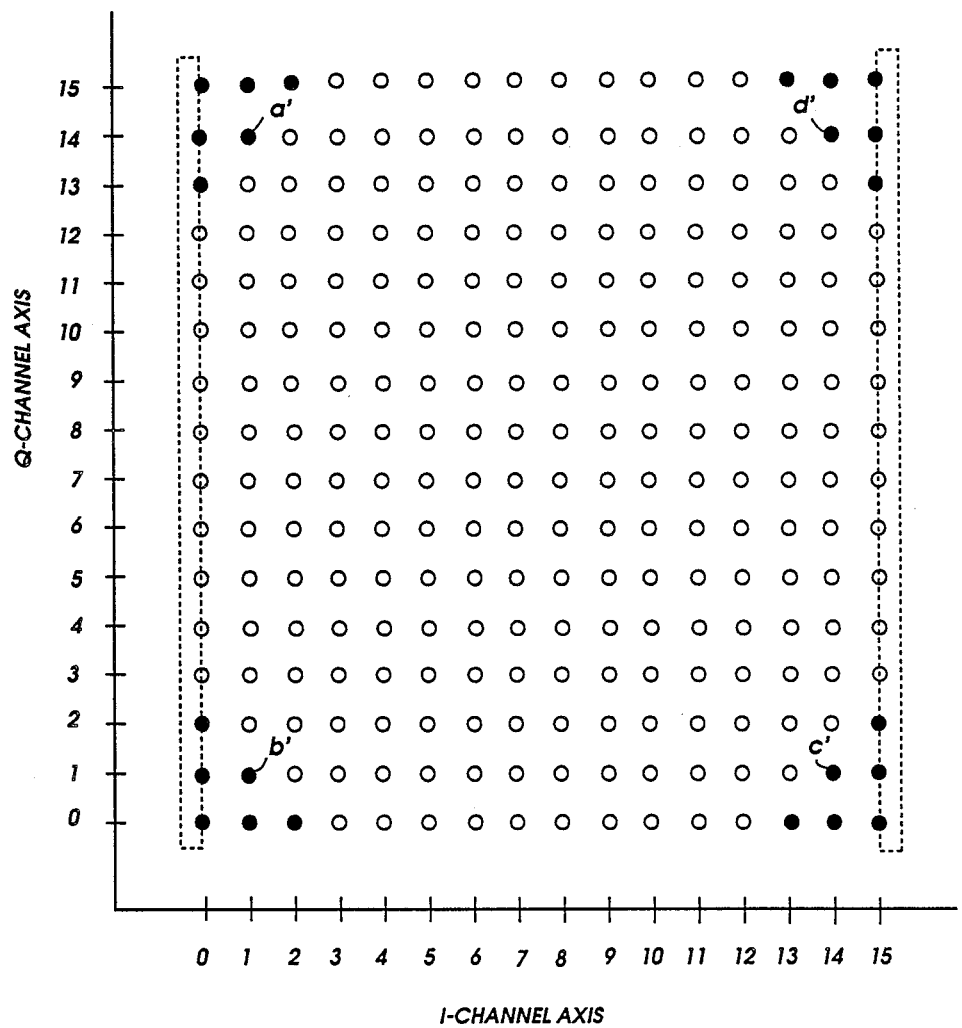
FIG. 5 is a phasor diagram of a conventional QAM system.

Control signal generator $3i$ detects a positive deviation of the maximum amplitude of the I-channel signal when a signal point lies within any of positive error regions shown at 24 and 25 of FIG. 4 and detects a negative deviation of the maximum amplitude when a signal point lies within any of negative error regions 26 and 27, counts the signal points associated with the detected positive and negative deviation that occur during a predetermined period of time and compares the counts with each other to generate a negative dc offset control signal to reduce the dc level of the I-channel signal if the count of positive deviations is greater than the other by a predetermined amount. Thus, a positive dc offset control signal is generated to increase the dc level if the count of positive deviations is smaller than the other by a predetermined amount. EAch of the dc levels of the I- and Q-channel demodulated signals is controlled so that it coincides with the center point of a corresponding decision threshold interval of the associated A/D converter 4. In addition, the control signal generator 3 detects signal points that occur within an error region 28 of minimum amplitudes (FIG. 4) and counts the detected signal points and compares the count with a total number of signal points detected as falling within the error regions 24 to 27. If this count is smaller than the total count of signals falling within the regions 24 to 27 by a predetermined amount, a negative gain control signal is supplied to the controller $2i$ that decreases the gain of amplification for the I-channel signal, and if it is greater than the total count by a predetermined amount, a positive gain control signal is supplied to increase the amplification gain.

Since the 4-bit main data signal conforms to the signal constellation of the C-QAM system, a logic-1 state of the auxiliary data signals $D2i$ and $D2q$ allows the demodulator of the present invention to be used as a demodulator of the C-QAM system.

It will be noted, however, that in the demodulator of the first embodiment of the invention there is a total of "36" signal points lying within the center rectangular region 28 of minimum amplitudes (see FIG. 4), while there is a total of "32" signal points that lie within the outermost rectangular regions 24 to 27. The difference between these counts causes signal points to fall within the region 28 with a higher probability than they fall within the regions 24 to 27 when each channel system is controlled to an optimum point (i.e., the size of eye pattern is at optimum), and results in the generation of a false gain control signal.

Figure 6:
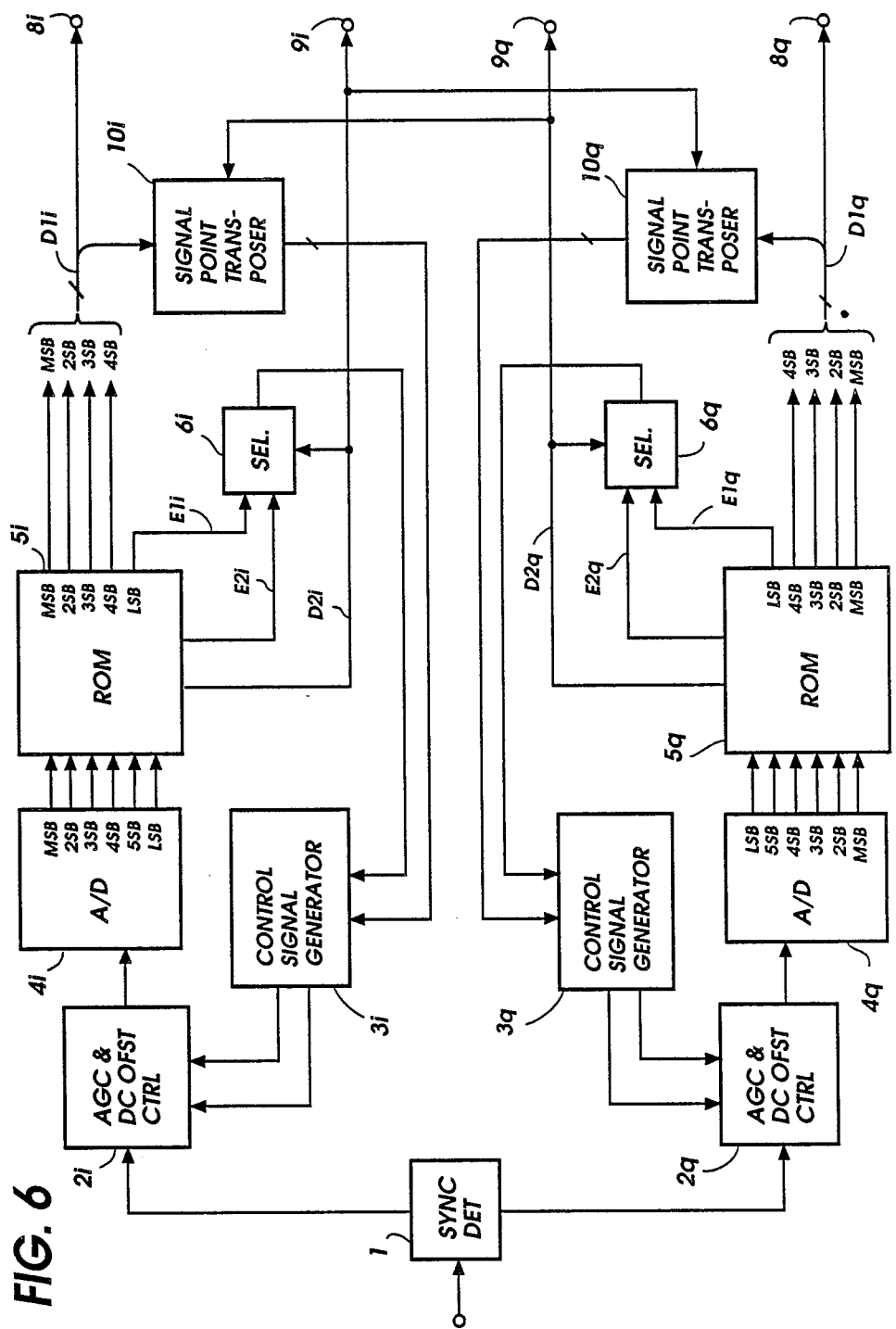
FIG. 6 is a block diagram of an SS-QAM demodulator according to a second embodiment of the present invention.

A second embodiment of the present invention is shown in FIG. 6 to overcome the disadvantages just described. In this embodiment, a signal point transposer $10i$ is connected to receive the main data signal $D1i$ (MSB to 4SB outputs) from ROM $5i$ and the auxiliary data signal $D2q$ from the Q-channel and supplies its output to the control signal generator $3i$ after transposing the four signal points shown at e, f, g and h in FIG. 4 from the region 28 to points shown at e', f', g' and h' outside of the region 28. This equalizes the count of signal points in region 28 to the count of "32" signal points in the regions 24 to 27.

Figure 7:
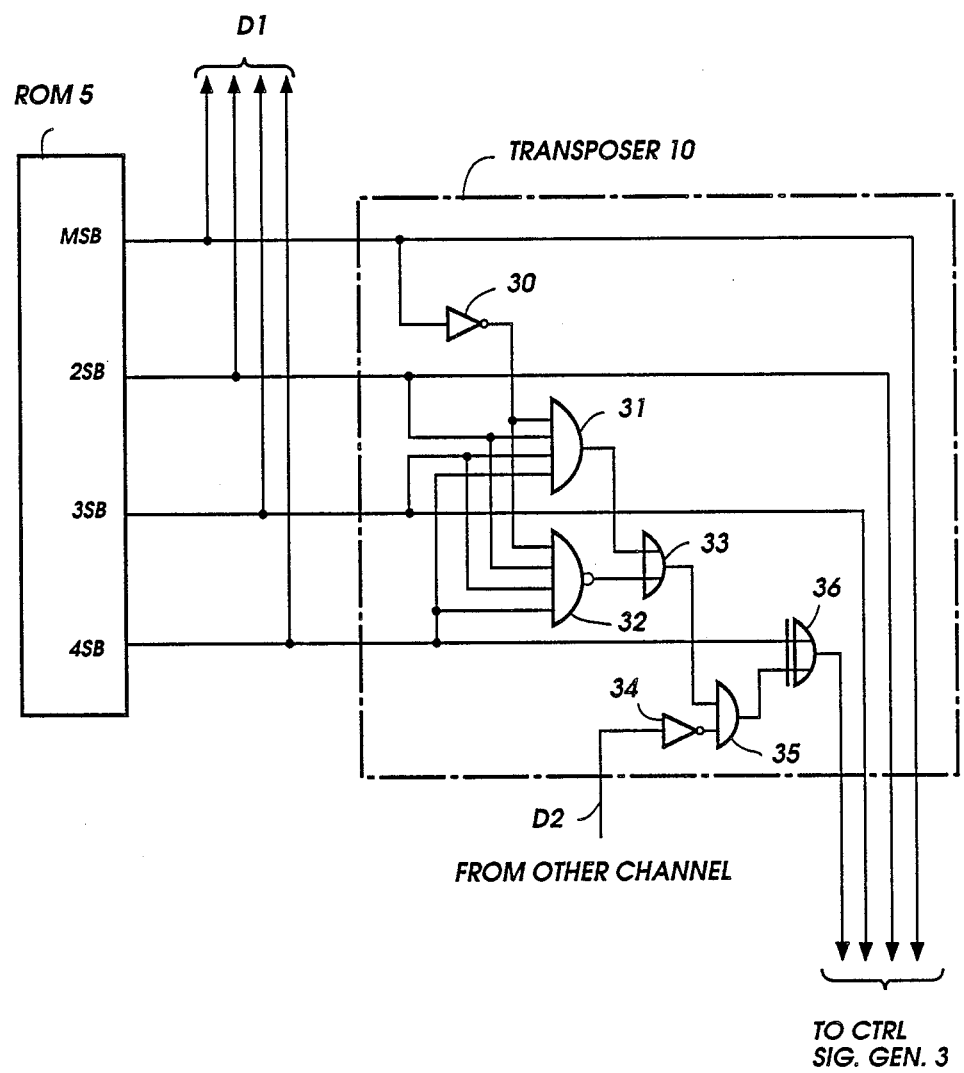
FIG. 7 is a circuit diagram of a signal point transposer of FIG. 6.

As shown in detail in FIG. 7, transposer 10 comprises an AND gate 31 and a NOR gate 32 each having first to fourth inputs thereof connected respectively to the MSB to 4SB outputs of ROM 5i with the first input being connected via an inverter 30. AND gate 31 switches to a logic-1 output state when the transposer receives amplitudes (level "7" represented by code "0111") at signal points on #7 column and NOR gate 32 switches to a logic-1 output state when it receives amplitudes (level "8" represented by code "1000") at signal points on #8 column. The outputs of AND gate 31 and NOR gate 32 are coupled through an OR gate 33 to an input of an AND gate 35 whose output is connected to one input of an exclusive OR gate 36 to which the 4SB of the ROM outputs is also connected for inverting the logic state of the LSB position of the main data signal D1i. The auxiliary data signal D2q is supplied through an inverter 34 to the AND gate 35. When the auxiliary data signal D2q is at logic 1, the output of the AND gate 35 is at logic 1, allowing the exclusive OR gate 36 to couple the LSB of the main data signal D1i to the control signal generator 3i together with the MSB to 3SB of the main data signal D1i. When the auxiliary data signal D2q switches logic 0, and if the I-channel amplitude is at signal point of the #7 or #8 column, AND gate 31 or NOR gate 32 goes logic 1 and hence the AND gate 35 switches to logic 1. Thus, the logic state of the LSB input is inverted, producing a code "0110" representing the signal point of the #6 column when the input amplitude level is "7" or a code "1001" representing the signal point of the #9 column when the input level is "8". Therefore, the auxiliary data signal D2q serves as a "window" pulse for shifting the locations of the signal points e, f, g and h from their original positions to outside the region 28, thus equalizing the number of signal points lying within the region 28 to the total number of signal points lying within the regions 24 to 27.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A stepped square QAM (quadrature amplitude modulation) demodulator comprising synchronous detector means for demodulating a signal modulated in accordance with a stepped square quadrature amplitude modulation system to produce a pair of I-channel (in-phase) and Q-channel (quadrature phase) demodulated analog signals, an I-channel system and a Q-channel system for processing said I-channel demodulated signal and said Q-channel demodulated signal, respectively, each of said I- and Q-channel systems comprising:
control means (2i, 2q) for receiving the demodulated signal of the associated channel and controlling the received signal in accordance with a control signal applied thereto;
analog-to-digital converter means (4i, 4q) for converting the output of said control means into an N-bit digital signal by comparison with decision thresholds;
means (5i, 5q) for converting the digital signals of outermost signal points of the stepped square phasor diagram of said SS-QAM system to digital signals of signal points which form corner portions of a true square phasor diagram and converting the digital signals of inner signal points of said stepped square phasor diagram to digital signals of corresponding signal points in said true square phasor diagram, deriving an M-bit main data signal from all of said converted digital signals (where M is smaller than N), and for generating an auxiliary data signal representative of whether said M-bit main data signal represents the digital signals of said inner or outermost signal points, a first error signal representative of an error component of said M-bit main data signal and a second error signal representative of an error component of said auxiliary data signal;
selector means (6i, 6q) for selecting one of said first and second error signals in response to said auxiliary data signal; and
control signal generator means (3i, 3q) for deriving said control signal from said selected error signal and said main data signal.

2. A stepped square QAM demodulator as claimed in claim 1, wherein said converting means comprises a memory in which said digital signals of said inner and outermost signal points are stored in locations addressable as a function of said N-bit digital signal.

3. A stepped square QAM demodulator as claimed in claim 1, wherein said control signal generating means provides a first count indicating the number of signal points falling in a first outermost area of said stepped square phasor diagram and a second count indicating the number of signal points falling in a second outermost area of said phasor diagram opposite to said first outermost area and produces a dc offset control signal as said control signal depending on the relative values of said first and second counts, and wherein said control means comprises a dc offset controller for controlling the dc level of an associated one of said channel signals in response to said dc offset control signal so that said dc level coincides with a center point between corresponding decision thresholds of said analog-to-digital converter means.

4. A stepped square QAM demodulator as claimed in claim 1, wherein said control signal generating means provides a first count indicating the number of signal points falling in a center rectangular area of said stepped square phasor diagram and a second count indicating the number of signal points falling in oppositely located outermost areas of said stepped square phasor diagram to produce a gain control signal as said control signal depending on the relative values of said first and second counts, and said control means comprises an automatic controlled amplifier means responsive to said gain control signal for varying amplification gain so that amplitude of an associated one of said channel signals coincides with a corresponding one of said decision thresholds of said analog-to-digital converter means.

5. A stepped square QAM demodulator as claimed in claim 4, wherein each of said channel systems further comprises equalizing means for processing said M-bit main data signal so that the maximum possible number of signal points in said center rectangular area is equalized to the maximum possible number of signal points in said outermost areas and for applying the processed M-bit main data signal to said control signal generator means.

6. A stepped square QAM demodulator as claimed in claim 5, wherein said equalizing means transposes the outermost signal points of said stepped square phasor diagram which lie within said center rectangular area to outside thereof in response to the auxiliary data signal of the other channel system.

7. A stepped square QAM demodulator as claimed in claim 6, wherein said equalizing means comprises means for inverting at least one data bit of said M-bit data signal which is supplied to said control signal generator means in response to said auxiliary data signal of the other channel system.

* * * * *